United States Patent [19]

Friedman et al.

[11] Patent Number: 4,755,344
[45] Date of Patent: Jul. 5, 1988

[54] METHOD AND APPARATUS FOR THE PRODUCTION OF CLUSTER IONS

[75] Inventors: Lewis Friedman; Robert J. Beuhler, both of Patchogue, N.Y.

[73] Assignee: The United States of America as represented by the United States Department of Energy, Washington, D.C.

[21] Appl. No.: 452,362

[22] Filed: Dec. 22, 1982

Related U.S. Application Data

[63] Continuation-in-part of Ser. No. 139,489, Apr. 11, 1980, abandoned.

[51] Int. Cl.$^4$ .............................................. G21B 1/02
[52] U.S. Cl. .................................. 376/108; 313/359.1; 313/362.1; 315/111.81; 250/423 R
[58] Field of Search ............... 376/108, 117; 250/251, 250/423 R; 313/359.1, 361.1, 362.1; 315/108, 111.01, 111.21, 111.81

[56] References Cited

U.S. PATENT DOCUMENTS

| | | | |
|---|---|---|---|
| 3,308,621 | 3/1967 | Pinsley | 313/359.1 |
| 3,393,339 | 7/1968 | Hill et al. | 313/359.1 |
| 3,513,351 | 5/1970 | Kelley | 376/108 |

OTHER PUBLICATIONS

Journal of Chemical Physics, vol. 59, No. 9, pp. 4726–4734, 1975, Gspann et al.
Proceedings of the 9th Symposium on Fusion Technology, pp. 885–890, 1976, Hagena et al.
Review of Scientific Instruments, vol. 48, pp. 675–681, 1977, Henkes et al.
The Journal of Chemical Physics, vol. 62, No. 6, pp. 2267–2270, 1975, Hiraoka et al.
Journal of Chemical Physics, vol. 61, No. 12, pp. 5282–5288, 1974, Searcy et al.
Analytical Chemistry, vol. 48, No. 12, pp. 1703–1768, 1976, Dzidic et al.

Primary Examiner—Deborah L. Kyle
Assistant Examiner—Richard L. Klein
Attorney, Agent, or Firm—Paul A. Gottlieb; Vale P. Myles; Judson R. Hightower

[57] ABSTRACT

A method and apparatus for the production of cluster ions, and preferably isotopic hydrogen cluster ions is disclosed. A gas, preferably comprising a carrier gas and a substrate gas, is cooled to about its boiling point and expanded through a supersonic nozzle into a region maintained at a low pressure. Means are provided for the generation of a plasma in the gas before or just as it enters the nozzle.

4 Claims, 4 Drawing Sheets

METHOD AND APPARATUS FOR THE PRODUCTION OF CLUSTER IONS

The United States Government has rights in the present invention pursuant to Contract No. DE-AC02-76CH00016, between the U.S. Department of Energy and Associated Universities, Inc.

CROSS-REFERENCE TO RELATED APPLICATIONS

This application is a continuation-in-part of co-pending patent application Ser. No. 139,489, filed Apr. 11, 1980, abandoned.

BACKGROUND OF THE INVENTION

This invention relates to a method and apparatus for the production of cluster ions. In a preferred embodiment, it relates to a method and apparatus for the generation of large cluster ions with narrow mass distributions. In a further preferred embodiment, it relates to the generation of hydrogen or isotropic hydrogen cluster ions. As the term is used throughout this application, "cluster ions" means an aggregation of atoms or molecules ranging in size from several tens of particles to in excess of several hundred thousand particles and carrying one or more units of electrical charge.

Since cluster ions are charged, they may be accelerated by conventional means. Such accelerated cluster ions are useful in the investigation of the interchange of energy between the electronic and nuclear structures of atoms, and in the investigation of condensed states of matter. They may also prove useful in the production of colloids and the treatment of surfaces. Cluster ions of the type prepared by the present invention may also be useful in doping solid material for potential use in semiconductors and solid state devices. Isotopic hydrogen cluster ions could be used to produce an intense cluster ion beam for heating plasmas for the ignition of controlled thermonuclear reactions. Isotopic hydrogen cluster ions may have particular use in the generation of neutral beams for use in magnetic confinement fusion apparatus and in other possible methods for the production of fusion energy. Light element-hydrogen cluster ions in which clusters containing mixtures of lithium or boron, for example, may also have valuable application in fusion systems.

Prior to the present invention, neutral clusters were formed by the expansion of gases, usually at room temperature, through supersonic nozzles with the generation of cluster ions through subsequent electron impact ionization. Typically, the gases would flow through a small nozzle from a pressure of about 1 atmosphere to a pressure of about $10^{-3}$ atmosphere. As the gas expanded and cooled small neutral clusters would form. These clusters would be aerodynamically accelerated to speeds greater than sound, hence the term "supersonic". These clusters would then pass through a further series of nozzles, typically referred to as "skimmers" and "collimators" into regions of still lower pressure, ultimately forming a beam of clusters which would then be charged by electron impact ionization, forming cluster ions by secondary emission of electrons.

Gspann, et al. ("Cluster Beams of Hydrogen and Nitrogen Analyzed by Time-of-Flight Mass Spectrometry", *Journal of Chemical Physics,* Volume 59, pages 4726–4734, November 1973) disclosed the production of neutral clusters of hydrogen and nitrogen from condensing supersonic nozzle flows. The resulting clusters were later ionized by electron bombardment.

The basic method described above has a number of major disadvantages. For the clusters to be most useful, they should be large cluster ions with a narrow mass distribution. Such cluster ions, it has been found, are best produced by forming the clusters at around the boiling point of the entity to be clustered. This usually requires operation at greatly decreased temperatures; for example for hydrogen around 18° K., and for nitrogen and argon around 77° K. Disadvantages resulted from the fact that in procedures such as that described by Gspann, et al., the clusters that were produced were neutral and subsequently had to be ionized. These neutral clusters are only weakly bound and thus they are subject to loss by re-evaporation and they are easily fragmented by electron impact while being charged. Further, the heat associated with producing the impact electrons will tend to re-evaporate the cluster ions, particularly as high electron impact current densities are used to produce high current cluster beams.

These disadvantages of the prior art are overcome by the present invention which provides a method for the generation of large cluster ions by the expansion of a purified ionized gas cooled to about or below its boiling point through a supersonic nozzle.

It is also known to ionize gases and to sample such ionized gases through an aperture opening into a region maintained at a low pressure. Searcy, et al. ("Clustering of Water on Hydrated Protons in a Supersonic Free Jet Expansion", *Journal of Chemical Physics,* Volume 61, pages 5282–5288, Dec. 15, 1974) made small clusters of water containing up to 28 water molecules and a single proton using a corona discharge to produce ions in gas at room temperature which was subsequently expanded in a supersonic nozzle. The work by Searcy, et al. was not done at low temperatures. Low temperature expansion of plasma requires the development of an ion source free of condensing insulating impurities that inhibit extraction of such ions from the cooled supersonic nozzle.

Devices known as Atmospheric Pressure Ionizers are also intended for use in conjunction with mass spectrometers. Such devices operated at room temperature and above are described by Dzidic, et al., "Comparison of Positive Ions Formed in Nickel-63 and Corona Discharge Ion Sources Using Nitrogen, Argon, Isobutane, Ammonia and Nitric Oxide as Reagents in Atmospheric Pressure Ionization Mass Spectrometry" *Analytical Chemistry,* Vol 48, No. 12, October 1976, and by Carroll, et al., "Subpicogram Detection System for Gas Phase Analysis Based Upon Atmospheric Pressure Ionization (API) Mass Spectrometry", *Analytical Chemistry,* Vol. 46, No. 6, May, 1974.

While some small charged clusters are formed by the Atmospheric Pressure Ionizer described, these clusters are considerably below the size range of "cluster ions" as that term is used in the present application. Further, since the Atmospheric Pressure Ionizer is intended as a source for mass spectrometers, charged clusters constitute a drawback in that they distort or interfere with the measurements made. For this reason the "pinhole" aperture described in the above references is heated to minimize clustering.

Thus, it is an object of the present invention to provide a method and apparatus capable of producing higher currents of cluster ions, over a wide range of initial conditions of temperature and pressure, and particularly to produce large clusters with narrow mass distributions.

It is a further object of the present invention to provide a method and apparatus for producing cluster ions which are charged at the amount of formation and thus more strongly bound and less subject to re-evaporation than cluster ions produced heretofore.

It is a further object of the present invention to provide a method and apparatus for the production of cluster ions where the initial clusters need not be subject to electron impact.

It is a further object of the present invention to produce singly charged, high molecular weight hydrogen clusters with narrow mass distributions.

SUMMARY OF THE INVENTION

The above objects are achieved and the disadvantages of the prior art are overcome by means of an apparatus comprising a source of a gas cooled to around the boiling point of the gas and held at a relatively high pressure and a supersonic nozzle having a diameter to length ratio of two or more. The nozzle connects the source to a region which is continuously pumped so as to maintain that region at a relatively low pressure. An electrode is positioned in relation to the nozzle and carries a potential such that at least a portion of the gas is ionized in the source and prior to the time that the gas expands through the nozzle.

The above apparatus functions by expanding a gas containing ions and electrons (i.e. a plasma) through the supersonic nozzle into a region of low pressure. The ions in the expanding gas act as "seeds" about which clusters may more readily form. Such clusters will tend to be larger than those produced by previous methods and, of course, will be charged at the time of formation. In addition, because of the repulsive forces between like charged particles, and the efficient charge exchange reactions which take place as the cluster ions form, clusters formed by the present invention are essentially all singly charged. This results in an improved, narrower, particle mass to charge distribution.

The present invention incorporates into the design of the cluster ion source an arrangement of elements required to produce efficient ionization in which contact between the ion plasma and surfaces containing electronegative elements is eliminated. Thus the production of impurities by interaction of the plasma with elements in the source is minimized. Such impurities can condense at low temperatures and effectively destroy the efficiency of the ion source by producing charged surfaces which retard ions and make their extraction from the ion source impossible.

The present invention is also advantageous in that, because of the large number of electrons and negative ions in the plasma, a relatively large number of negative cluster ions are formed. Thus, the present invention is more suitable as a source of negative cluster ions than the prior art sources using electron impact ionization which tended to produce largely positive cluster ions.

Other objects and advantages of the subject invention will become apparent to those skilled in the art from the drawings and the detailed description set forth below.

DETAILED DESCRIPTION OF THE INVENTION

Figure 1:
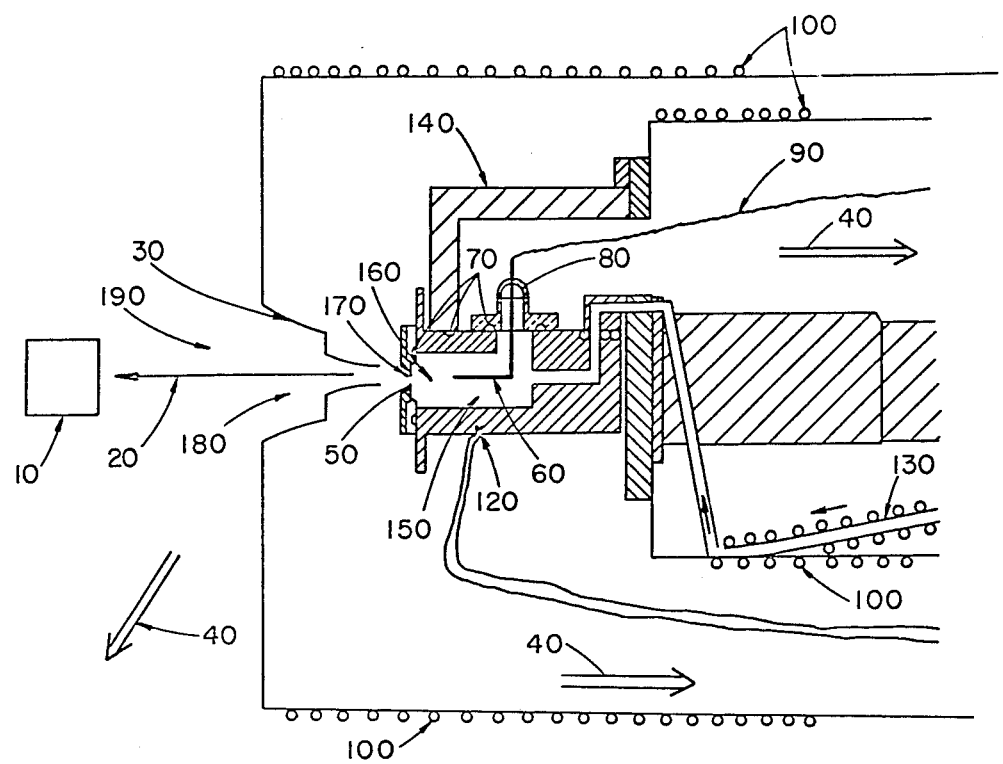
FIG. 1 is a semi-schematic view along the length of an apparatus in accordance with the subject invention.

Referring to FIG. 1, there is shown a longitudinal view of one embodiment of the present invention. The embodiment shown is particularly adapted to operate at very low temperatures, such as those required to generate cluster ions.

Source gas inlet tube 130 is provided for introducing a stream of cooled gas to nozzle assembly 140. In the embodiment shown gas inlet tube 130 is connected to a conventional gas supply (not shown). The gas in the inlet tube is pre-cooled to a temperature of 77° K. by the copper coils 100 which carry liquid nitrogen. The copper coils 100 serve as well as a radiation shield around the source components cooled to low temperatures. Cooling can also be supplied by a cryogenic liquid such as liquid helium. After the inlet gas has been cooled, as by liquid nitrogen, the gas in the source can be further cooled by a conventional cryogenic system if necessary. In embodiments where the substrate gas from which the cluster ions are to be formed has a higher boiling point ordinary refrigeration may suffice. Thermocouple 120 is used for temperature measurement of ion source chamber 150.

The gas supplied may be pure, for example pure hydrogen, but preferably consists of a substrate gas, like hydrogen substrate in an inert carrier gas such as helium. Helium is preferred since it is a noble gas and does not readily become incorporated in the cluster ions. When the source 150 is used to produce hydrogen cluster ions, it is preferable that the percentage of hydrogen is from about 1 to about 10 percent by volume. The gas mixture is supplied at a pressure of from about 1 to about 10 atmospheres, and preferably from about 1 to 3 atmospheres. When the apparatus of the present invention is used at greatly reduced temperatures, i.e. the temperature of liquid nitrogen, or below, it is critical to minimize the introduction of impurities which can condense in critical regions of the source and cause the source to be inoperative in the production of cluster ions. Thus the gas coming into the source has to be carefully decontaminated to remove traces of impurities; impurities present should be less than one part in $10^{12}$.

In addition, because of the low temperatures used, the seals 70 in the apparatus are formed from indium to prevent leakage and brittleness. Arrows 40 show the direction of the differential pumping that is maintained throughout the system to provide the proper pressures throughout.

In addition to purifying the gas coming into the source, it is also essential to design the source to minimize the production of impurities during the formation of the cluster ions. This requires two critical design parameters. The electrode and aperture of the source must be so arranged to permit generation of electrical discharge, the seed upon which the cluster ions grow, in such a way that the plasma or discharge does not generate any impurities by chemical reaction. For example, any teflon insulation used cannot be near the discharge or the resulting chemical reaction will produce impurities. Such impurities could become deposited upon critical regions of the source and could interfere with the formation of the cluster ions or the flow of the ion beam through the aperture. The second critical design parameter results from the recognition that at these very low temperatures, the surface of the aperture from which the ions are extracted has to be conducting. The formation and deposit of insulating impurities could result in the aperture becoming charged, which would render the apparatus inoperative. For the same reason, the aperture must be designed so that its thickness is minimized to reduce the area of potentially insulating surface.

Arc input voltage wire 90 is supplied to the arc wire 60. Glass insulator 80 is so positioned to minimize any chemical reactions producing impurities. The seed ions and cluster ions formed by the discharge given off by arc wire 60 into the atmosphere of cooled gas travel through aperture 170. This aperture is made in nozzle 50 and is preferably approximately 0.001 inches in diameter. The actual size of aperture 170 will always be determined by the pumping capacity available to maintain the required pressure drop across nozzle 50. Low pressures are required outside the nozzle or aperture to minimize thermal conductivity from the surrounding walls to the source block.

Means are provided in the present invention for the generation of a plasma (i.e. ionized gas) in the region 160 immediately upstream of aperture 170. The preferred means shown in the present embodiment comprise arc input voltage wire 90 connected to a DC power supply (not shown). Nozzle 50 is formed of a conductive material, preferably gold foil, is extremely thin, preferably about 0.002 inches thick, is slightly diverged, and is electrically connected to the other terminal of power supply (not shown) typically through ground. The gold foil is preferred because it is resistant to anodization by negative ions. The arc wire electrode 60 is maintained at a sufficient potential, and is so positioned, that a small region 160 of partially ionized gas is formed immediately upstream of aperture 170.

The partially ionized gas expands through aperture 170 into a region 180 which is bounded by skimmer aperture 30. Ports (not shown) are provided through which region 180 is differentially pumped, by conventional means, (not shown), to a pressure of approximately $10^{-3}$ atmospheres. Cluster ions form around the "seed" ions in the plasma as the gas expands into region 180. The beam of cluster ions 20 may move in the direction of mass spectrometer 10 if analysis is desired.

The combination of the ionizing means with supersonic nozzle 50 is critical to the present invention. It is important that the ionized gas be formed in region 160. Then as the seed ions move toward and through aperture 170 there is time for a sufficient number of collisions for cluster ions to grow before they reach the low pressure region 180 where the frequency of collision drops off to the point where there is essentially no further growth.

Those cluster ions (and other particles) which have velocities substantially parallel to the center line of the apparatus will pass through skimmer aperture 30 into region 190, bounded by the skimmer and apparatus body (both not shown). Ports (not shown) are provided through which region 190 is differentially pumped by conventional means to a pressure of about $10^{-6}$ atmospheres.

The skimmer is a diverging nozzle having an aperture 30 of about 0.40 millimeters diameter located about 1.0 millimeter from nozzle 50. Other dimensions of the skimmer are not critical but the angle of divergence should be fairly great to rapidly reduce the probability of collision between cluster ions.

The skimmer serves two purposes. First, it introduces the beam into region 190 where the pressure is maintained low enough that there is essentially no chance of collisions between cluster ions and background gas. Second, it collimates the beam of cluster ions. Since the heavier particles are more likely to have nondivergent velocities collimation also reduces the number of carrier gas particles and smaller cluster ions.

In one embodiment of the invention, the beam may leave the apparatus through a collimator, which preferably has an orifice approximately 0.60 millimeters in diameter. The beam coming from the skimmer is thus further collimated and typically will then be further accelerated by electrical fields. Further stages of collimation may be provided if desired. The region outside the apparatus is generally maintained at a pressure less than $10^{-6}$ atmospheres. The skimmer and collimator are preferred but not essential to the operation of the present invention. It is further preferred that they be cone shaped to minimize the formation of shock wave in the beam.

EXPERIMENTAL EXAMPLES

All experiments were conducted in an apparatus substantially similar to that shown in FIG. 1. Initial source gas pressures are in centimeters, measured on a mercury manometer. The typical voltage applied to the arc wire was 2500 to 3000 volts. Exit aperture from the source was usually in the diameter range from 0.0015 to 0.0008 inches. If the apparatus was being used to produce hydrogen cluster ions, the following procedure would be used. When the source was at room temperature, hydrogen gas was admitted tpo the source and the arc turned on. Mass spectra were obtained, usually indicating large background peaks of water clusters. When most of this water and other impurities had been flushed from the source, the system was cooled, first with liquid nitrogen to 77° K. During this cooling time, the water peaks diminished while peaks characteristic of hydrogen began to appear. For example, at a pressure of 20 cm hydrogen at 77° K., the spectrum of clusters peaked at mass 21. If the intensity of the ions was good, indicating a clean source, then the second cooling system was started and the source operation was monitored down to the desired operating temperature, usually in the range of 18° to 30° K.

EXAMPLE I

Figure 2:
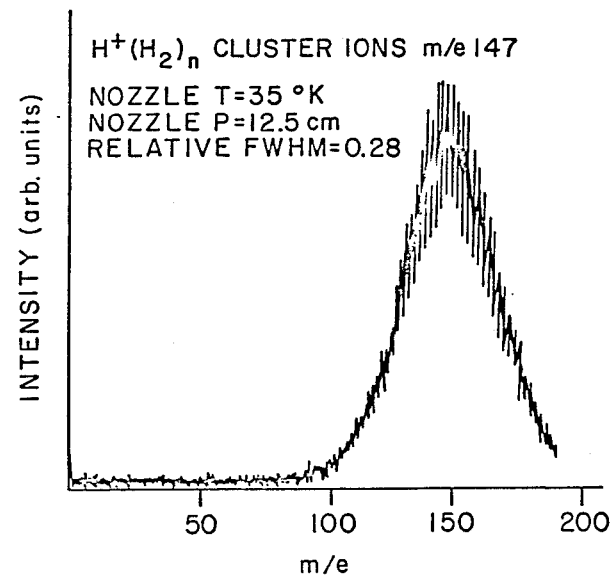
FIG. 2 is a mass spectrum of clusters produced from the apparatus of the present invention at 35° K. with hydrogen pressure at 125 Torr.

An experiment following the general procedures set forth above was conducted using pure hydrogen gas. The hydrogen gas was cooled to 35° K. and a source gas pressure of 125 Torr was used. FIG. 2 shows the mass spectrum of the cluster ions produced.

EXAMPLE II

Experiments following the general procedures set forth above were run using an isotopic hydrogen substrate gas in a helium carrier gas. Examination of the size distribution showed that species produced differed in mass by multiples of 2 atomic mass units.

This indicates that in this preparation of hydrogen cluster ions, the carrier does not appear in the cluster; therefore, it appears that the carrier gas ions are not acting as "seed" ions, nor are neutral carrier particles joining clusters. It is believed that carrier gas ions formed enter into rapid, efficient charge transfer reactions with hydrogen molecules at the pressure in the source. The hydrogen ions produced serve as "seed" ions around which cluster ions form and are collisionally de-excited in the source and during expansion in the nozzle.

EXAMPLE III

Figure 3:
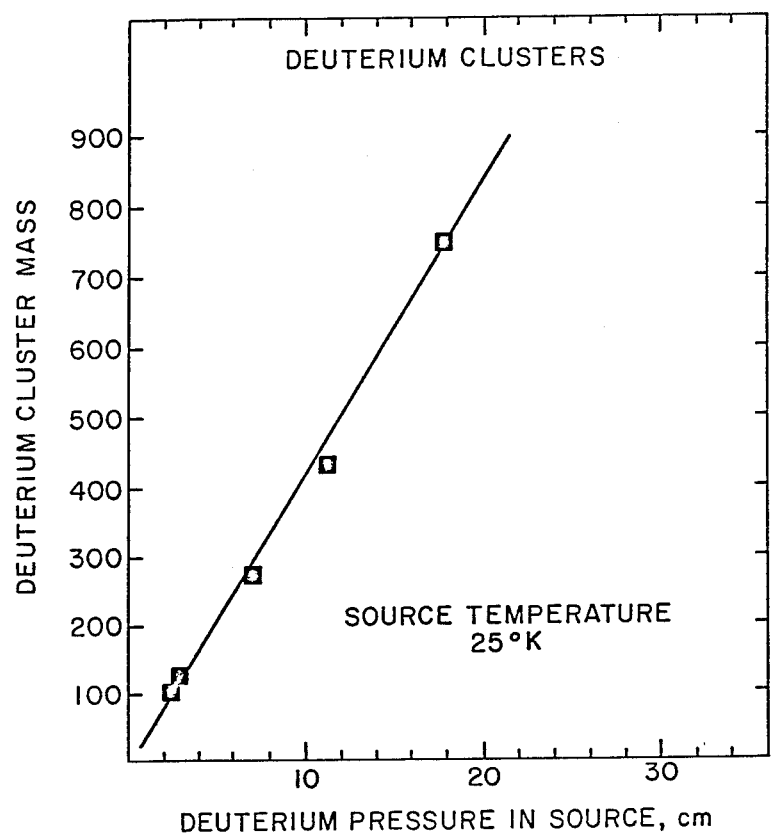
FIG. 3 is a plot of experimental data showing the mass of deuterium clusters as a function of deuterium pressure in the source.

An experiment following the general procedures set forth above was conducted using pure deuterium gas. The deuterium gas was cooled to about 25° K. FIG. 3 is a plot of experimental data showing the mass of deuterium clusters as a function of deuterium pressure in the source.

EXAMPLE IV

An experiment substantially similar to those described above was run using nitrogen as the substrate gas in a helium carrier. The concentration of nitrogen was approximately 5% by volume, the gas pressure was approximately 1 atmosphere, and the experiment was conducted at about 77° K.

A nozzle as described above, having an orifice diameter of approximately 0.006 inches was used.

Cluster ions with masses corresponding to up to 500 nitrogen molecules were detected. The mass peaked at approximately 500 molecules of nitrogen, or a molecular weight of about 15,000.

EXAMPLE V

An experiment was run substantially similar to the general procedure set forth in the Experimental Examples section above, using water vapor as the substrate gas in a nitrogen carrier, and conducting the experiment at room temperature.

A mixture of water vapor in nitrogen gas was passed through a supersonic nozzle as described above, having an orifice approximately 0.006 inches in diameter. The concentration of water vapor was varied from about 1 to 3 percent and the gas pressure was about 1 atmosphere. The pressure downstream of the nozzle was maintained at about $10^{-3}$ atmospheres.

Figure 4:
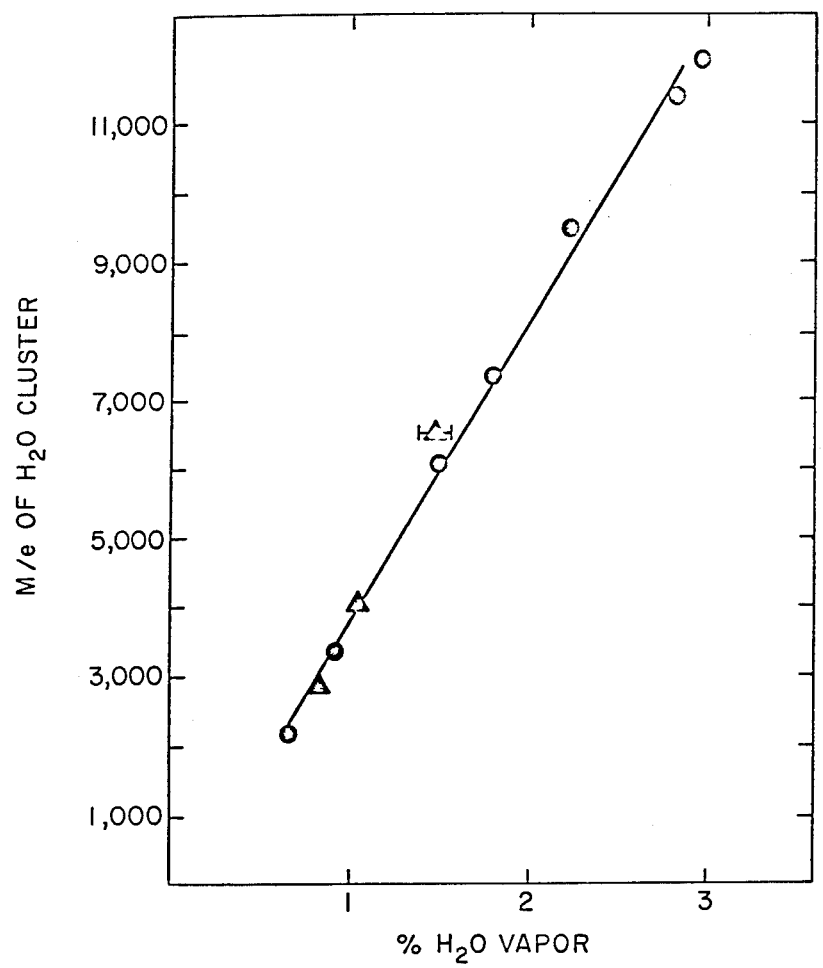
FIG. 4 is a plot of the experimentally measured mass/charge ratio of $H_2O$ cluster ions versus the percentage of water vapor in a nitrogen carrier gas.

FIG. 4 is a plot of mean cluster ion size (i.e., mean number of molecules per cluster or mass to charge ratio) in atomic mass units versus the percentage of water vapor in the gas.

This experiment demonstrates the successful operation of the apparatus of the present invention at room temperature as well as at reduced temperatures. It also demonstrates a directly proportional relationship between substrate gas concentration and cluster size. It was also noted that the number of cluster ions produced was relatively independent of the substrate gas concentration; indicating that the number of cluster ions formed is most strongly dependent on the number of "seed" ions produced.

The above description and examples are set forth by way of example and illustration in order to enable those skilled in the art to practice the present invention. The present invention is defined, and its limitations set forth, only in the following claims.

We claim:

1. An apparatus for the production of large hydrogen or deuterium cluster ions of narrow mass distribution comprising:
   (a) a source of purified hydrogen gas cooled to temperatures below 30° K. and held at a predetermined pressure; and
   (b) means for ionizing said gas, said ionizing means being located so as to minimize the formation of impurities through chemical reactions and so as to create such ionized gas immediately upstream of a supersonic nozzle, said nozzle being about 0.002 inches thick in its axial direction to prevent its becoming insulated through deposit of impurities or reaction products thereon and said nozzle opening into a first region that is maintained at a low pressure relative to said predetermined pressure.

2. An apparatus as described in claim 1, wherein said gas source includes means for supplying a mixture of isotopic hydrogen substrate gas in a helium gas carrier.

3. A method for producing large cluster ions of narrow mass distribution, comprising the steps of:
   (a) providing a source of a selected purified substrate gas,
   (b) cooling said substrate gas to a temperature near or below its boiling point,
   (c) providing an ion source chamber that is essentially free of insulating impurities,
   (d) introducing said cooled substrate gas into said chamber at a predetermined pressure,
   (e) ionizing said substrate gas with ionizing means located in said chamber so as to minimize the formation of impurities through chemical reactions,
   (f) passing a stream of the ionized gas from said chamber through an electrically conductive supersonic nozzle into a first region that is maintained at a pressure substantially lower than said predetermined pressure, said nozzle having an axial thickness of about 0.002 inches and being prevented from becoming insulated by deposits of impurities or reaction products thereon, whereby large cluster ions are grown in said first region of relatively lower pressure.

4. A method as defined in claim 3 including the step making said nozzle of metal foil, at least in the portion thereof immediately adjacent to the nozzle aperture.

* * * * *